Patented Feb. 6, 1951

2,540,170

UNITED STATES PATENT OFFICE 2,540,170

COMPOSITION FOR AND METHOD OF INHIBITING FUNGI

George H. Law, South Charleston, W. Va., and Richard H. Wellman, Yonkers, N. Y., assignors, by mesne assignments, to Union Carbide and Carbon Corporation, a corporation of New York No Drawing. Application September 9, 1944, Serial No. 553,464

16 Claims. (Cl. 167—33)

This invention relates to fungicidal compositions and to methods of combatting fungi, and more particularly to such practical, effective, low cost compositions and methods as may be used effectively on desirable plant life to prevent the growth of the parasitic fungi and yet not have a deleterious effect upon the host plant while in foliage.

A foliage fungicide must, primarily, prevent infection of the host by the fungus for which it is being used. It must also be selective and have a margin of safety in that, as used, it must not burn or injure the foliage of the host plant severely at concentrations necessary to control the fungus. The foliage fungicide should also resist weathering which includes wash-off caused by rain, decomposition by ultra-violet light, oxidation and hydrolysis in the presence of moisture or, at least, such decomposition, oxidation and hydrolysis as materially decreases the desirable characteristics of the material, for instance the fungicidal action, or imparts undesirable characteristics, for instance phytotoxicity, to the material. The fungicide should also be compatible with other constituents of the spray schedule, in particular insecticides. The control of fungi attacking other plants is a problem because the host and the parasitic fungus are both plants and it is difficult to inhibit the parasite and yet not injure the living host.

There are two major groups of commercial fungicides for plants in foliage, in general use at present, viz, copper compounds and sulfur compounds. The outstanding examples of the respective groups are Bordeaux mixture and agricultural "lime-sulfur." These are objectionable because of their limitations due either to their phytotoxicity or their incompatibility with other components of the spray schedule. For example, lime-sulfur sprays often cause severe phytotoxicity to apples when used at effective concentrations in late season sprays under conditions of high temperature. An objection to Bordeaux mixture is that it cannot be used in effective concentrations in early season sprays on apple foliage because of resultant phytotoxicity.

We have found that certain substituted glyoxalidines are fungicides with such high fungicidal activity and such low phytotoxic effect on a living plant as to be useful in fungicidal sprays. Not all substituted glyoxalidines possess this combination of properties. We have found that 2-heptadecyl glyoxalidine has peculiar and unexpected properties with respect to fungicidal and phytotoxic activity and is an excellent foliage fungicide. Certain substituted glyoxalidines which have other groups, for instance hydroxyethyl and aminoethyl, at the 1 position as well as the heptadecyl group at the 2 position also possess these peculiar and unexpected properties.

The graphic general formula of substituted glyoxalidines is:

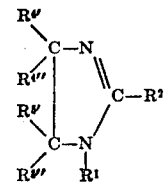

wherein the numerals represent the numbers of the positions used throughout this description.

In the glyoxalidines contemplated herein, $R^2$ of the graphic formula must be a saturated organic radical having 17 carbon atoms in the form of a chain, either single or branched, for instance a heptadecyl group. $R^1$, $R^{4'}$, $R^{4''}$, $R^{5'}$, and $R^{5''}$ may be hydrogen or organic groups. The organic radicals will hereinafter be referred to as "substituents" and, for brevity, the 2-heptadecyl glyoxalidines will often be referred to merely as "glyoxalidines," the text indicating which glyoxalidine is meant.

Whether or not there are lower alkyl substituents at $R^{4'}$, $R^{4''}$, $R^{5'}$, and $R^{5''}$, for instance substituents having up to about 4 carbon atoms, appears to make no great difference in the fungistatic or phytotoxic properties of the glyoxalidines. The substituents at $R^1$ and $R^2$ are, however, important. In general, an unsaturated 17 carbon atom group (a heptadecenyl group) at $R^2$ undesirably increases the phytotoxic effect of the glyoxalidine, and $R^2$ substituent groups standing close to the heptadecyl groups either increase the phytotoxic effect or lower the fungistatic action. Glyoxalidines where the $R^2$ substituent is other than one having the carbon atom of the substituent connected directly to the ring carbon atom at the 2 position are too costly to manufacture to be used generally as agricultural toxicants.

The substituent at $R^1$ should be saturated, may contain from 1 to 3, inclusive, carbon atoms in the from of a chain and may contain inorganic groups, for instance the amino and hydroxyl groups. In general, $R^1$ straight-chain substituent groups, for instance the butyl, allyl and hexyl groups, standing close to the 1 to 3 carbon atom saturated groups undesirably increase the phytotoxicity of the 2-heptadecyl glyoxalidines, particularly where the substituent is unsaturated. Ring substituents at either $R^1$ or $R^2$ either decrease fungistatic action or increase phytotoxicity.

It should be understood that substituted glyoxalidines other than those contemplated herein, for instance glyoxalidines having unsaturated substituents at the 1 and 2 positions, may be useful in dormant agricultural sprays, for instance sprays to be used during winter when the trees are not in foliage, or as toxicants for treating dead material, for instance cut wood, and the like; and, with phytotoxic-safening agents, for instance pine oil, may even be used as foliage sprays but the substituted glyoxalidines, as a general class, do not have the outstanding and unexpected combination of high fungistatic activity and low phytotoxic activity which is found in the substituted glyoxalidines contemplated herein, which combination of properties enables these glyoxalidines to be used either as the sole or principal inhibitor or toxicant, or jointly with a wide variety of other inhibitors, or in combination with or shortly after the use of a wide variety of insecticides and the like. The glyoxalidines contemplated herein have such low phytotoxic activity that when used in the amounts necessary to inhibit fungi effectively, they do not injure the host plant or, stated in another manner, they have such a high fungistatic activity that they may be used in such small amounts as not to injure the host and yet inhibit the fungi.

Following are methods of test to which representative glyoxalidines contemplated herein, have been subjected. The results of the tests are also given.

(1) *The slide germination method.*—Essentially this test method consisted of germinating spores in continual contact, on glass slides, with given concentrations of the chemical under test. The germination was observed after 24 hours and the amount of the chemical needed to inhibit germination of 50% (L. D. 50 value) of the spores was determined. The procedure used is more fully set forth in a paper entitled "The slide-germination method of evaluating protectant fungicides," published in Phytopathology, July 1943, vol. XXXIII, No. 7, pp. 627–632. Four different and typical fungi were used for this test. The fungi tested were *Sclerotinia fructicola* (Wint.) Rehm, which causes brown rot of stone fruits as cherries, peaches and the like; *Alternaria solani* (Ell. and Mart.) Jones and Grout, which causes leaf spot (early blight) on tomatoes; *Glomerella cingulata* (St.) Sp. and von S., which causes bitter rot of apples; and *Macrosporium sarcinaeforme* (Cav.), which causes a leaf spot of clover. These are all Eumycetes. The numerals of the following table give the parts by weight of the glyoxalidine under test, in a million parts by weight of liquid, to prevent the germination of 50% of the spores. The numerals are the average for the four fungi. The liquid used which, of itself, did not inhibit germination of the spores, was distilled water containing 0.1% of ultra-filtered orange juice. The orange juice was used to obtain a high and consistent germination of the fungous spores.

(2) *Phytotoxicity.*—For this test, growing Turkish tobacco, Japanese buck wheat and bush bean plants (var. Tendergreen) were used as they are representative members of different plant families. Tobacco represents the Solanaceae (potato family) which includes the potato, tomato, eggplant, and the peppers. Buck wheat represents the Polygonaceae (buck wheat family) which includes rhubarb and dock. Bush bean represents the Leguminosae (pea or bean family) which includes vetches, peas, alfalfa, clovers, lentils, soybeans, and peanuts.

At least one of each of the plants, growing in a greenhouse so that the conditions of test were known, was sprayed with the composition under test. Only one spray composition was used on any plant. Several compositions of each chemical under test, were prepared. Each of the compositions contained a different amount of the chemical under test but the minimum amount of chemical ever used was that which gave an L. D. 50 value according to the germination test. The maximum amount of chemical used was that which was near the maximum that could be handled with the spraying equipment. In most cases it was 1% by weight of the chemical in water. The injury or lack of injury done to the plant by the compositions containing the various concentrations of the chemical, was noted by a trained observer. With plant injury plotted against concentration of chemical, a curve was drawn from which curve the percent of chemical for threshold injury was found. Compositions containing more and less of the chemical indicated as necessary to give the threshold injury were then made and these compositions were sprayed on plants to check the values found on the curves.

The compositions used in the tests forming the basis for the following table were made in the following manner: For L. D. 50 value there were usually made 10 concentrations of glyoxalidine varying by either 2-fold or the $\sqrt{2}$ fold so adjusted on the basis of preliminary tests that concentrations on both sides of the L. D. 50 were covered. Thus for 1-hydroxyethyl-2-heptadecyl glyoxalidine, a series was prepared consisting of: 50, 25, 12.5, 6.25, 3.125, 1.562, 0.781, 0.390, 0.195, 0.097 parts in 1,000,000 parts of water (parts by weight). For the phytocidal tests, usually 8 concentrations varying by the $\sqrt{2}$ were prepared starting with the highest concentration that could readily be sprayed. Thus for 1-hydroxyethyl-2-heptadecyl glyoxalidine this series consisted of: 2.000, 1.414, 1.000, 0.707, 0.500, 0.353, 0.250, 0.176 parts per 100 parts of water (parts by weight). In the case of the more phytotoxic glyoxalidines it was necessary to conduct orientation experiments before the correct compositions for determining the threshold of injury could be chosen. The compositions for the phytotoxicity tests contained only the glyoxalidine and water so that the results were not obscured by the presence of other active materials. The compositions for the L. D. 50 value tests contained, in addition to the glyoxalidine and water, only the stated amount of orange juice. The values given in the following table are the percent by weight of the chemical in the spray which gives threshold injury except where the value is 1 or greater. Where the value is 1 or greater, the indication is that with the maximum amount of chemical in the spray, the plant is uninjured. The method of test is more fully set forth in a paper entitled "A system for classifying effectiveness of fungicides in exploratory tests," by Wellman and McCallan, printed in "Contributions from Boyce-Thompson Institute," vol. 13, No. 3, pp. 171–176, 1943.

For comparative purposes, the following table also gives the results of tests on certain substituted glyoxalidines which would seem to be so closely related to the 2-heptadecyl glyoxalidines as to be satisfactory, but which are unsatisfactory because of high phytotoxic properties.

| Glyoxalidine | L. D. 50 Value | Phytotoxicity |
|---|---|---|
| 1-hydroxyethyl-2-heptadecyl | 3.7 | .450 |
| 1-aminoethyl-2-heptadecyl | 4.2 | 1.000 |
| 2-heptadecyl | 15 | .350 |
| 2-heptadecenyl | 17 | .0597 |
| 1-hydroxyethyl-2-heptadecenyl | 5.1 | .088 |
| 1-hydroxyethyl-2-pentadecyl | 3.3 | .0711 |
| 1-allyl-2-heptadecyl | 5.7 | .0377 |
| 1-butyl-2-heptadecyl | 6.1 | .0409 |
| 1-hexyl-2-heptadecyl | 10 | .0597 |

Of the above glyoxalidines the compounds containing hydrophilic groups (aminoethyl and hydroxyethyl) form saturated aqueous solutions at 75° C. containing about 0.01% glyoxalidine by weight. Saturated solutions of the other compounds listed contain about 0.002% of the respective glyoxalidines under similar conditions.

As the first three of the listed glyoxalidines are so nonphytotoxic, sprays which incorporate them may contain a large amount of the substance and yet not be too phytotoxic. Thus, using the 1-hydroxyethyl-2-heptadecyl glyoxalidine as a basis of practical measurement, sprays containing a dispersion of 10 parts by weight of this glyoxalidine in 1000 parts by weight of water are practical for use and even though there may be some slight phytotoxic action it will not be sufficient to overcome the advantage of having the excess glyoxalidine present as a reserve. The 2-heptadecyl glyoxalidine is only slightly more phytotoxic than the 1-hydroxyethyl-2-heptadecyl glyoxalidine and its lower water solubility balances its slightly higher phytotoxicity in field use. The 1-aminoethyl-2-heptadecyl glyoxalidine has, as shown, very low phytotoxicity. The other glyoxalidines listed, however, are so phytotoxic that spray compositions consisting of water and these glyoxalidines are too phytotoxic for use if the composition contains sufficient of the glyoxalidine to be sufficiently fungistatic.

The glyoxalidines contemplated herein may be used with adjuvants. Such adjuvants may be of the type to prevent foaming of the spray composition or of the type which cause the glyoxalidines to adhere to the host and prevent the loss of the glyoxalidines from the treated host, for instance loss due to wash-off by rain, blowing off by wind and the like. Adjuvants of both types may be used. Suitable adjuvants of the type preventing loss of fungicide are talcs, clays, pyrophyllite, bentonite, and the like. These materials are water-insoluble adhesive agents and are nonphytotoxic. Other adjuvants and even water-soluble adjuvants may, however, be used.

In the matter of additive materials, the spray composition is preferably free or substantially free of materials which retain the glyoxalidines to such an extent that an aqueous solution of the glyoxalidines having at least the L. D. 50 value cannot form. If the adjuvants or other materials preferentially hold the glyoxalidines against water, either by solvation or otherwise, a very large proportion of the glyoxalidines must be used in the spray to make the glyoxalidine available to the spore. Due to the great number of adjuvants and other materials which may be used with the glyoxalidines, examples of all of these and of the proportions thereof to the glyoxalidines cannot be given but the laws relating to such proportions are relatively simple. It must be recognized that even the glyoxalidines contemplated herein are phytotoxic to a slight extent and therefore if the added material is also phytotoxic, the amount of added material must be so small that the combination of the glyoxalidine and the added material is not too phytotoxic. Assuming, however, that the added material is not phytotoxic but is a solvent for the glyoxalidines, so much of the glyoxalidines must be used that, at least, an L. D. 50 value aqueous solution of the glyoxalidines can form, and spread over the foliage. If this does not occur the composition is not sufficiently fungicidal. It should be understood that a fungous spore does not germinate except in the presence of water and that such germination is a necessary preliminary to the infection of the plant. The opportunity for a spore to germinate occurs when a water-base spray is applied to the plant and after each rain and when dew forms but these are also the conditions under which the inhibitive solutions of the glyoxalidines form. Adjuvants of the loss-preventing type which mechanically or physically hold the undissolved glyoxalidine of the spray composition and absorb or adsorb but do not preferentially dissolve the glyoxalidine in the spray composition as against water, are the preferred adjuvants. After the spray composition has been applied and dried, upon the next rain such adjuvants release sufficient of the glyoxalidine to the rain water on the foliage to form a saturated aqueous solution of rain water and glyoxalidine or at least an L. D. 50 value solution which spreads the glyoxalidine over the foliage and leaves a deposit of the glyoxalidine when the water evaporates as was the case when the original spray dried after application. If the glyoxalidine is of itself too phytotoxic these same saturated or L. D. 50 value solutions will form but, in this case, the foliage will be damaged due to the phytotoxicity of the glyoxalidine.

The substituted glyoxalidine, 2-heptadecyl glyoxalidine, is substantially hydrophobic, as are also such substituted glyoxalidines which also have purely hydrocarbon $R^1$ substituents. These glyoxalidines are not emulsifying or dispersing agents. Where, however, the $R^1$ substituent contains a water-solubilizing inorganic group, for instance the hydroxy group or the amino group, the substituted glyoxalidines have hydrophilic properties and a tendency toward water solubility; and they exhibit foaming as well as emulsifying characteristics. Foaming is undesirable in sprays used in commercial orchards and the like as in such cases the spraying apparatus includes a tank containing a beater or stirrer which continually beats or stirs the spray mixture to prevent insolubles from settling out, and if foaming occurs it is difficult for the pump to force the spray mixture through the sprayer. We have found that the glyoxalidines contemplated herein are not deleteriously affected by suitable adjuvants which are antifoam agents, for instance aliphatic alcohols containing from about 6 to 18 carbon atoms, nor are the fungistatic and phytotoxic properties of the glyoxalidines affected by such agents. It is a feature of the invention that the glyoxalidines contemplated herein are so chemically inert that they do not react with the antifoam agent, nor do they react chemically with foliage, either with or without the antifoam agent, in a deleterious manner. The antifoam agent should not increase the phytotoxicity of the composition and preferably is quite volatile so that it disappears when the composition is on the plant. About 0.50 lb. to 0.75 lb. of an aliphatic alcohol containing from about 6 to about 18 carbon atoms, for instance 2-ethyl hexanol (1 gal.=6.94 lbs.), per 100 gallons of spray mixture is satisfactory although larger quantities may be used, for instance up to about 2 pints per 100 gallons of spray mixture. Thus, we have discovered that fungicidal compositions containing glyoxalidines, to be practical, should be used as nonfoaming sprays and where the hydrophilic glyoxalidines are used, an antifoam agent may and preferably should be incorporated. The 2-heptadecyl glyoxalidine, being substantially hydrophobic and nonemulsifying, need not be used with an antifoam agent. Also, being substantially hydrophobic and not surface active, it has greater tenacity to the foliage than have the glyoxalidines with surface active and emulsifying characteristics and is less easily washed off of the foliage by rain.

Except in the cases where the fungicides are used to inhibit fungi in seed-treatments where dusting is more convenient, the fungicides are preferably applied as water-base sprays. In such sprays, particularly when used on foliage, the more water-insoluble glyoxalidines and those exhibiting more pronounced hydrophobic characteristics are preferred as there is less water-wash from the foliage than if a water-soluble glyoxalidine is used. The 2-heptadecyl glyoxalidine is a somewhat more satisfactory product than 1-aminoethyl-2-heptadecyl glyoxalidine in cases where the host plant is subjected to the normal amount and intensity of rain which occurs in the vicinity of New York, N. Y.

The fungicidal spray compositions may be prepared in any suitable manner. The glyoxalidine may be ground in a portion of the water component, for instance in a ball mill, to make about a 25% dispersion which is then incorporated with the remainder of the water which may or may not already contain the other components of the spray composition.

Also, the glyoxalidines may be dissolved in a solvent, preferably a solvent which is highly water soluble, for instance isopropanol, the solution then being incorporated with water, preferably by adding the solution to the water while suitably stirring the water, whereupon the glyoxalidines are thrown out of solution in a very finely divided, substantially colloidal, condition. Preferably, a low or minimum amount of solvent is used but the glyoxalidine is preferably in solution in the solvent and not merely in suspension, enough of the solvent being used to have all of the glyoxalidine dissolved. Solutions containing about 25% of the glyoxalidine in a solvent alcohol, have proven to be satisfactory; and the solvent alcohol may also operate as an antifoam agent but in this case the alcohols preferably have vapor pressures below and boiling points above ethyl alcohol.

Adjuvants and other components of the spray compositions may be added at any time, that is, prior to, simultaneously with or after the mixing of the glyoxalidine and water. It is generally preferred, where water-insoluble adjuvants and other water-insoluble materials are components of the spray composition, to grind or otherwise disperse the insoluble components in a portion of the water until the insoluble components are in a state of fine subdivision and then to incorporate this mixture into the remainder of the water component which may or may not already contain the glyoxalidine.

As used in field tests where the glyoxalidines are the sole inhibiting agent, the spray compositions contain more of the glyoxalidines than are necessary to give an L. D. 50 value. Field sprays may contain from about 0.10 lb. to about 6 lbs. of the glyoxalidines per 100 gallons (about 834 lbs.) of water. Satisfactory sprays for general use contain between about 0.25 to 3.00 lbs. of the glyoxalidine per 100 gallons of water. The spray compositions preferably contain so much glyoxalidine that they are in the form of slurries. The slurries comprise dissolved as well as undissolved (solid) glyoxalidine or glyoxalidine absorbed by the adjuvant so that when the spray dries there is not only the glyoxalidine which is deposited from the solution by the evaporation of the water but also the surplus glyoxalidine which acts as a reserve, ready to dissolve and spread over the plant in case of rain. The glyoxalidines contemplated herein have such low phytotoxic activity and high fungistatic activity that when used as slurries containing undissolved glyoxalidine, they inhibit the fungus yet do not injure the host plant. Of course, even the glyoxalidines contemplated herein have some phytotoxic effect, as previously stated, and if used with other materials, for instance oils, which give an added phytotoxic effect, both effects should be taken into account.

In the compositions, the glyoxalidines are preferably the dominant toxic or inhibiting agent and the compositions should be free or substantially free of phytotoxic agents to the end that the combination of glyoxalidine and such other agent as may be used, is substantially nonphytotoxic. The compositions should be substantially free from and preferably contain no phytotoxic mineral oil. Fungicidal compositions usually do not contain such oils as they are generally phytotoxic to the plant and nontoxic to the fungus. If any mineral oil is used it must be such and used only in such small amounts that the composition is not phytotoxic to plants in foliage and yet is fungicidal. The usual mineral oils, when used in conjunction with the glyoxalidines, give compositions which cannot be used as fungicides on plants in foliage although such compositions are satisfactory for use on dead material and may be satisfactory for use on dormant hosts. For plants in foliage the mineral oil which may be used, if any, should have a maximum viscosity of not over 80 Saybolt Universal seconds at 100° F. and preferably has a viscosity of under 60 seconds, for instance between about 30 and 60 seconds. The oil should also be substantially free of (contain less than 15% of) unsaturated hydrocarbons or should contain suitable antioxidants. The oils should contain more than 85% unsulfonatable residue and be composed substantially entirely of saturated hydrocarbons. Generally unsatisfactory oils are crude oils or oils having a viscosity of more than 80 seconds, or oils containing more than 15% of unsaturated hydrocarbons or less than 85% unsulfonatable residue or which are not composed substantially entirely of saturated hydrocarbons. The compositions are essentially free of the unsatisfactory oils and preferably are substantially free of all unsaturated aliphatic materials. Compositions containing substantial amounts of unsaturated hydrocarbon radicals (either in the glyoxalidines, oils or other materials in the amounts in which these materials are necessary for fungicidal purposes) may be satisfactory for use on dead material or dormant hosts but are generally too phytotoxic for use on plants in foliage.

Mineral oils which are usually used for agricultural purposes are the so-called dormant-spray or winter-spray oils which are too phytotoxic to be used on plants in foliage. Even the summer-spray oils of the higher viscosities form compositions with the glyoxalidines contemplated herein which are too phytotoxic. The aminoethyl- and the hydroxyethyl-glyoxalidines contemplated herein, since they have hydrophilic properties, may be used to emulsify oils in water. However, using so-called nonphytotoxic oils with viscosities between 80 and 154 Saybolt Universal seconds at 100° F., compositions containing from 1% to 10% of 1-hydroxyethyl-2-heptadecyl glyoxalidine to from 99% to 90% of oil, 5% of this composition being used with 95% water to form oil-in-water emulsion spray compositions were unsatisfactory as fungicides on plants in foliage in that the compositions were too phytotoxic. This does not mean that the glyoxalidines may not be used with lighter nonphytotoxic oils, for instance those with a viscosity of less than 80 Saybolt Universal seconds at 100° F., or with amounts of such mineral oils where the proportions are substantially less than 90% mineral oil to 10% of the glyoxalidine or where the glyoxalidine is present in larger proportion so that sufficient of it is not dissolved in the oil or the glyoxalidine is so concentrated in the oil that the glyoxalidine is available to the spore and the composition is fungicidal and not phytotoxic.

In the matter of phytotoxicity, 1 part of either 2-heptadecyl glyoxalidine or 1-hydroxyethyl-2-heptadecyl glyoxalidine added to 9 parts of a mineral oil of 75 Saybolt Universal seconds viscosity with an unsulfonatable residue of 99% and the mixture made into a spray composition containing 5 parts of the mixture and 95 parts of water and sprayed on tomato and bean plants in early summer gave phytotoxicity (although mild) on both plants. Another oil with a viscosity of 81 Saybolt Universal seconds and an unsulfonatable residue of 76% was severely phytotoxic when used at the rate of 5 parts of the oil in 95 parts of water without any glyoxalidine.

Under extremely phytotoxic late summer conditions, for instance where the temperature is about 100° F. or above, for several days at a time, and the atmosphere is quite humid, for instance 85 or over, 1 part by weight of a combination of mineral oil and 1-hydroxyethyl-2-heptadecyl glyoxalidine and sufficient water to make 100 parts gave moderate toxicity on tomato plants. The mineral oil used had a viscosity of 75 Saybolt Universal seconds at 100° F. and an unsulfonatable residue of 99.0%; and on a weight basis under these conditions had about the same phytotoxicity as 1-hydroxyethyl-2-heptadecyl glyoxalidine. Sprays containing either 1% of this glyoxalidine, 0.75% of this glyoxalidine plus 0.25% of this oil, 0.50% of the glyoxalidine plus 0.50% of the oil, 0.25% of the glyoxalidine plus 0.75% of the oil, or 1% of the oil all had about the same phytotoxicity. There was only a trace of injury, even under these extremely phytotoxic conditions, with 0.5% total weight of the glyoxalidine and of the oil, and sufficient water to make up 100 parts by weight.

Compositions containing from 1 to 100 parts by weight of the glyoxalidines contemplated herein, from 10 to 100 parts of a predominantly paraffinic mineral oil characterized by a viscosity of less than 80 Saybolt Universal seconds at 100° F. and an unsulfonatable residue of 85% or more, and 10,000 parts by weight of water, with or without added non-phytotoxic adjuvants, are not too phytotoxic to be used for the purposes disclosed herein even with the higher amounts of glyoxalidine and oil, on plants in foliage which are highly resistant to phytotoxicity. The higher amounts of glyoxalidine and oil, in combination, will cause some phytotoxicity even on the highly resistant plants but it will not be too severe on these plants. These compositions all contain less than 4% by weight of mineral oil and contain a maximum of about 2% of combined glyoxalidine and oil. For general purposes, compositions comprising the glyoxalidine and oil will contain less than the 2% of combined glyoxalidine and oil, desirably a maximum of about 1.5% (preferably less) of combined glyoxalidine and the above-mentioned oil, or an oil of even lower phytotoxic characteristics, for instance from about 0.25 to about 3.00 lbs. of the glyoxalidine and from a small quantity to about 6 lbs. of the oil per 100 gallons of water for general use, this amount being less than about 0.5% of the glyoxalidine and less than about 0.75% of the oil on the weight of the water. Under extremely phytotoxic conditions or with plants which are highly susceptible to phytocidal influences, the total weight of oil and glyoxalidine will be a maximum of 1% of the spray, preferably a maximum of 0.5% of the spray. The preferred toxicant is the 2-heptadecyl glyoxalidine because of its nonfoaming, nonemulsifying and nonsurface-active properties.

With the exception of the small amounts of antifoam agents and solvents which may be used, the compositions are also preferably free of alcohol, ether, acetone and the like, and free of such other materials and amounts thereof as are used in disinfectants, antiseptics, medicines, ethereal oils, cosmetics, face lotions, gargles and the like. The compositions should also preferably be free of dyes, coloring materials and the like, these being unsightly and by changing the character of light may change the effect of light on the composition or on the host plant. The compositions should also be free of strongly alkali media which tend to cause flocculation of the glyoxalidines. The glyoxalidines also form water-soluble salts with mineral acids and lower organic acids, for instance organic acids having up to about 4 carbon atoms and these promote phytotoxicity; the compositions are preferably substantially free of such acids.

Field tests against apple scab caused by *Venturia inaequalis* on McIntosh and Stayman apple trees gave the following results:

*For one comparative test*

| Compound | Concentration in lbs. per 100 gals. of spray | Per Cent Scabby Fruit | |
|---|---|---|---|
| | | McIntosh | Stayman |
| Glyoxalidine: | | | |
| 2-heptadecyl | 1.50 | 1.5 | 2.1 |
| 1-aminoethyl-2-heptadecyl | 3.00 | 1.7 | 1.6 |
| Standard lime sulfur | ¹ 16 or ¹ 13 | 3.0 | 2.1 |
| Check (no spray) | | 99.5 | 100 |

*For another comparative test*

| Compound | Concentration in lbs. per 100 gals. of spray | Per Cent Scabby Fruit | |
|---|---|---|---|
| | | McIntosh | Stayman |
| Glyoxalidine: 1-hydroxyethyl-2-heptadecyl | 1.00 | 3.0 | 2.1 |
| Standard lime sulfur | ¹ 16 or ¹ 13 | 13.0 | 6.1 |
| Check (no spray) | | 99 | 78 |

¹ For early season sprays 16 lbs.; for late season sprays 13 lbs.

The aminoethyl- and hydroxyethyl-glyoxalidine sprays contained (per 100 gallons of spray), in addition to the stated amounts of the glyoxalidine, 1 lb. of 2-ethyl-hexanol and, to facilitate the incorporation of the glyoxalidines, they were added to the spray tank as 25% solutions in isopropanol, for instance 12 lbs. of a solution consisting of 3 lbs. of 1-aminoethyl-2-heptadecyl glyoxalidine and 9 lbs. of isopropanol were used. However this alcohol is readily volatile and evaporated quite rapidly during the spraying and after the mixture deposited as a thin film on the foliage. The only other ingredient was sufficient water to make 100 gallons of spray. The sprays were made by adding the glyoxalidines prepared as above indicated or the lime sulfur to the spray tank together with the required amount of water and beating up the mix.

The lime-sulfur spray was a commercial product containing lime, sulfur and water in the approximate proportions of 50 lbs. of quick lime, 100 lbs. of flowers of sulfur and sufficient water to make 50 gallons. The commercial product is prepared by boiling these ingredients together for approximately an hour, maintaining the volume constant, until a reddish-brown color develops. Thirteen or sixteen lbs. of this composition was used with the appropriate amount of additional water to make 100 gallons of spray composition.

All of the materials were applied with the same apparatus on trees of substantially the same size with the same amount of spray per tree. The materials were also applied on the same days, the same number of sprayings of each material being applied throughout the season beginning about the latter part of April and ending about the middle of June, at intervals of about 10 days, covering a spray schedule of delayed dormant, pink, petal fall, first cover, second cover and, in one season also a July third cover, sprays.

The fungicides contemplated herein are generally effective in inhibiting fungi under all conditions. The substituted glyoxalidines are compatible with many other control agents, for instance lead arsenate and nicotine as regards the continued performance of the glyoxalidine. Many of the fungicides of the type contemplated herein and compositions comprising them are very resistant to weathering, particularly in combination with suitable adjuvants, have low phytotoxic effect and are quite selective in that they inhibit the fungi yet do not injure the host plant either because of direct phytotoxic effect of the fungicide or because of the phytotoxic effect of products formed from the fungicide.

The glyoxalidines contemplated herein are as effective, or more effective against fungi than other heterocyclic nitrogen compounds, for instance they are much more effective than nicotine, morpholine, N-butyl morpholine, piperazine, ethylene thiocarbamide, 2-mercaptothiazoline, 2-5-dimethyl pyrrolidine, 2-4-dimethyl quinoline and 1,3-dibutyl-2-imidazolidine.

The glyoxalidines are also effective as insecticides but insecticidal compositions based upon the glyoxalidines and compounded for field use preferably contain water-soluble glyoxalidines which penetrate the insect or contain an insecticidal adjuvant which is compatible with the glyoxalidine and penetrates the insect, carrying the glyoxalidine with it into the body of the insect. Fungicidal compositions preferably contain water-insoluble or substantially water-insoluble glyoxalidines or a fungicidal adjuvant of the type heretofore described which is a non-penetrant. Also, insecticides may be effective as insecticides and yet contain so little of even the phytotoxic glyoxalidines that there is substantially no phytotoxic effect on the treated plant while to be effective as fungicides the fungicidal compositions contain so much of the glyoxalidines that, for field work, there is danger of phytotoxic effect, which may however be avoided by using the compositions described above.

The foregoing observations are based upon insecticidal and fungicidal compositions wherein the glyoxalidines are the sole toxic or inhibiting agent. The glyoxalidines may be used in conjunction with other toxic or inhibiting agents so that the amount of glyoxalidine present may be decreased, but it is preferred that the glyoxalidine be the dominant toxic ingredient. Thus a combined fungicidal and insecticidal composition may be prepared wherein a glyoxalidine is the primary fungicidal agent and nicotine or lead arsenate is the primary insecticidal agent. The presence of these insecticidal agents does not adversely affect the fungistatic action of the glyoxalidines. Also a composition may be prepared containing both the glyoxalidine and another fungicidal agent, for instance tetramethyl thiuram disulfide.

Another composition containing the glyoxalidines may contain a water-insoluble glyoxalidine which is primarily a fungicide and a water-soluble glyoxalidine which is primarily an insecticide. The composition may also contain a fungicide adjuvant and an insecticidal adjuvant and a phytotoxic safening agent. Pine oil is a phytotoxic safening agent as well as an insecticidal adjuvant. The proportions of the glyoxalidines and adjuvants will be balanced, so that the composition will kill insects and prevent disease caused by fungi.

The invention is susceptible of modification within the scope of the appended claims.

What is claimed is:

1. Method of inhibiting fungi which comprises applying to a host a fungicidal composition comprising, as an active fungicidal ingredient, a substituted glyoxalidine having a saturated 17 carbon atom aliphatic group connected directly to the carbon atom at the 2 position in the glyoxalidine ring, and a diluent, the composition containing undissolved glyoxalidine and having a phytotoxic activity no greater than that corresponding to a dispersion of 10 parts by weight of 1-hydroxyethyl-2-heptadecyl glyoxalidine in 1000 parts by weight of water.

2. Method of inhibiting fungi which comprises applying to a host a composition characterized by high fungicidal activity and low phytotoxic effect comprising water and, as an active fungicidal ingredient, a glyoxalidine having a saturated 17 carbon atom aliphatic group connected directly to the carbon atom at the 2 position in the glyoxalidine ring and having at the 1 position a saturated aliphatic group containing less than 4 carbon atoms and a hydrophilic substituent, the composition containing undissolved glyoxalidine and having a phytotoxic activity no greater than that corresponding to a dispersion of 10 parts by weight of 1-hydroxyethyl-2-heptadecyl glyoxalidine in 1000 parts by weight of water.

3. Method of inhibiting fungi which comprises applying to a host a composition characterized by high fungicidal activity and low phytotoxic effect comprising water and, as an active fungicidal ingredient, a glyoxalidine having a saturated 17 carbon atom aliphatic group connected directly to the carbon atom at the 2 position in the glyoxalidine ring, and another fungicidal agent, the composition containing undissolved glyoxalidine and having a phytotoxic activity no greater than that corresponding to a dispersion of 10 parts by weight of 1-hydroxyethyl-2-heptadecyl glyoxalidine in 1000 parts by weight of water.

4. Method of inhibiting fungi which comprises applying to a host a composition characterized by high fungicidal activity and low phytotoxic effect comprising water and, as an active fungicidal ingredient, a glyoxalidine having a saturated 17 carbon atom aliphatic group connected directly to the carbon atom at the 2 position in the glyoxalidine ring, and an insecticidal agent, the composition containing undissolved glyoxalidine and having a phytotoxic activity no greater than that corresponding to a dispersion of 10 parts by weight of 1-hydroxyethyl-2-heptadecyl glyoxalidine in 1000 parts by weight of water.

5. Fungicidal composition comprising water, mineral oil and, as an active fungicidal ingredient, a glyoxalidine having a saturated 17 carbon atom aliphatic group connected directly to the carbon atom at the 2 position in the glyoxalidine ring, the mineral oil being substantially nonphytotoxic and containing more than 85% of unsulfonable residue, the composition containing a maximum of about 2% by weight of combined oil and glyoxalidine based on the weight of the water.

6. Method of inhibiting fungi which comprises applying to a host a composition characterized by high fungicidal activity and low phytotoxic effect comprising water and, as an active fungicidal ingredient, a glyoxalidine having a saturated 17 carbon atom aliphatic group connected directly to the carbon atom at the 2 position in the glyoxalidine ring, the composition containing undissolved glyoxalidine and having a phytotoxic activity no greater than that corresponding to a dispersion of 10 parts by weight of 1-hydroxyethyl-2-heptadecyl glyoxalidine in 1000 parts by weight of water.

7. Method of inhibiting fungi which comprises applying to a host a composition characterized by high fungicidal activity and low phytotoxic effect comprising water and, as an active fungicidal ingredient, a glyoxalidine having a 17 carbon atom saturated aliphatic group connected directly to the carbon atom at the 2 position in the glyoxalidine ring, and having at the 1 position a saturated aliphatic group containing less than 4 carbon atoms, the composition containing undissolved glyoxalidine and having a phytotoxic activity no greater than that corresponding to a dispersion of 10 parts by weight of 1-hydroxyethyl-2-heptadecyl glyoxalidine in 1000 parts by weight of water.

8. Method of inhibiting fungi which comprises applying to a host a composition characterized by high fungicidal activity and low phytotoxic effect comprising water and, as an active fungicidal ingredient, a glyoxalidine having a 17 carbon atom saturated aliphatic group connected directly to the carbon atom at the 2 position in the glyoxalidine ring, and having at the 1 position a saturated aliphatic group containing less than 4 carbon atoms and an amino group, the composition containing undissolved glyoxalidine and having a phytotoxic activity no greater than that corresponding to a dispersion of 10 parts by weight of 1-hydroxyethyl-2-heptadecyl glyoxalidene in 1000 parts by weight of water.

9. Method of inhibiting fungi which comprises applying to a host a composition characterized by high fungicidal activity and low phytotoxic effect comprising water and, as an active fungicidal ingredient, a glyoxalidine having a 17 carbon atom saturated aliphatic group connected directly to the carbon atom at the 2 position in the glyoxalidine ring, and having at the 1 position a saturated aliphatic group containing less than 4 carbon atoms and a hydroxyl group, the composition containing undissolved glyoxalidine and having a phytotoxic activity no greater than that corresponding to a dispersion of 10 parts by weight of 1-hydroxyethyl-2-heptadecyl glyoxalidine in 1000 parts by weight of water.

10. Method of inhibiting fungi which comprises applying to a host a composition characterized by high fungicidal activity and low phytotoxic effect comprising water and, as an active fungicidal ingredient, a hydrophobic 2-heptadecyl glyoxalidine, the composition having a phytotoxic activity no greater than that corresponding to a dispersion of 10 parts by weight of 1-hydroxyethyl-2-heptadecyl glyoxalidine in 1000 parts by weight of water.

11. Method of inhibiting fungi which comprises applying to a host a composition characterized by high fungicidal activity and low phytotoxic effect comprising water, an aliphatic alcohol, and, as an active fungicidal ingredient, a hydrophobic 2-heptadecyl glyoxalidine, the composition having a phytotoxic activity no greater than that corresponding to a dispersion of 10 parts by weight of 1-hydroxyethyl-2-heptadecyl glyoxalidine in 1000 parts by weight of water.

12. Method of inhibiting fungi which comprises applying to a host a composition characterized by high fungicidal activity and low phytotoxic effect comprising water and, as an active fungicidal ingredient, 2-heptadecyl glyoxalidine, the composition having a phytotoxic activity no greater than that corresponding to a dispersion of 10 parts by weight of 1-hydroxyethyl-2-heptadecyl glyoxalidine in 1000 parts by weight of water.

13. Method of inhibiting fungi which comprises applying to a host a composition characterized by high fungicidal activity and low phytotoxic effect comprising water, an aliphatic alcohol, and, as an active fungicidal ingredient, 2-heptadecyl glyoxalidine, the composition having a phytotoxic activity no greater than that corresponding to a dispersion of 10 parts by weight of 1-hydroxyethyl-2-heptadecyl glyoxalidine in 1000 parts by weight of water.

14. Method of inhibiting fungi which comprises applying to a host a composition characterized by high fungicidal activity and low phytotoxic effect comprising water, isopropanol, and, as an active fungicidal ingredient, 2-heptadecyl glyoxalidine, the composition having a phytotoxic activity no greater than that corresponding to a dispersion of 10 parts by weight of 1-hydroxyethyl-2-heptadecyl glyoxalidine in 1000 parts by weight of water.

15. Method of inhibiting fungi which comprises applying to a host a composition characterized by high fungicidal activity and low phytotoxic effect comprising water and, as an active fungicidal ingredient, a hydrophobic 2-heptadecyl glyoxalidine, in the proportion of from 0.10 pound to 6 pounds of the glyoxalidine per 100 gallons of water, the composition having a phytotoxic activity no greater than that corresponding to a dispersion of 10 parts by weight of 1-hydroxyethyl-2-heptadecyl glyoxalidine in 1000 parts by weight of water.

16. Method of inhibiting fungi which comprises applying to a host a composition characterized by high fungicidal activity and low phytotoxic effect comprising water and, as an active fungicidal ingredient, 2-heptadecyl glyoxalidine, in the proportion of from 0.10 pound to 6 pounds of the glyoxalidine per 100 gallons of water, the composition having a phytotoxic activity no greater than that corresponding to a dispersion of 10 parts by weight of 1-hydroxyethyl-2-heptadecyl glyoxalidine in 1000 parts by weight of water.

GEORGE H. LAW.
RICHARD H. WELLMAN.

REFERENCES CITED

The following references are of record in the file of this patent:

UNITED STATES PATENTS

| Number | Name | Date |
|---|---|---|
| 1,958,529 | Beckmuhl et al. | May 15, 1934 |
| 2,143,816 | Jacobson | Jan. 10, 1939 |
| 2,156,193 | Puetzer | Apr. 25, 1939 |
| 2,214,152 | Wilkes | Sept. 10, 1940 |
| 2,268,273 | Wilkes et al. | Dec. 30, 1941 |
| 2,282,931 | Bruson | May 12, 1942 |
| 2,392,326 | Kyrides | Jan. 8, 1946 |
| 2,399,601 | Kyrides et al. | Apr. 30, 1946 |
| 2,418,077 | Kyrides et al. | Mar. 25, 1947 |

OTHER REFERENCES

Beilstein's Handbuch der Organischen Chemie, vol. 23, page 31 (1936 ed.).